J. K. STEWART.
MAGNETIC SPEEDOMETER.
APPLICATION FILED MAY 13, 1911.
1,033,840.
Patented July 30, 1912.
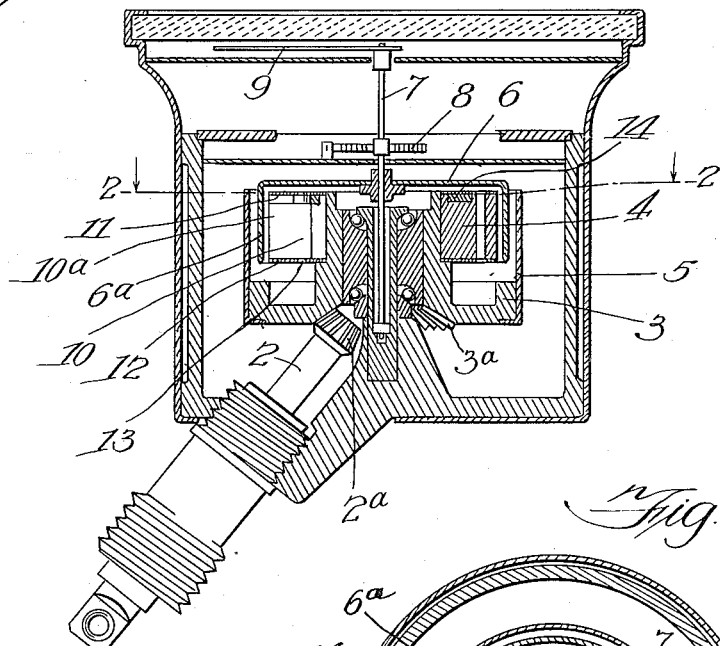
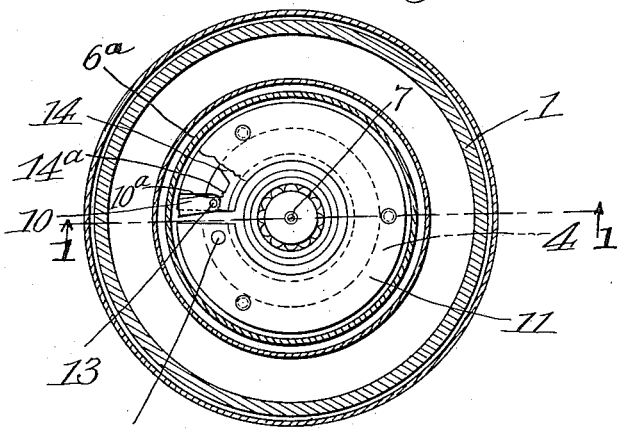
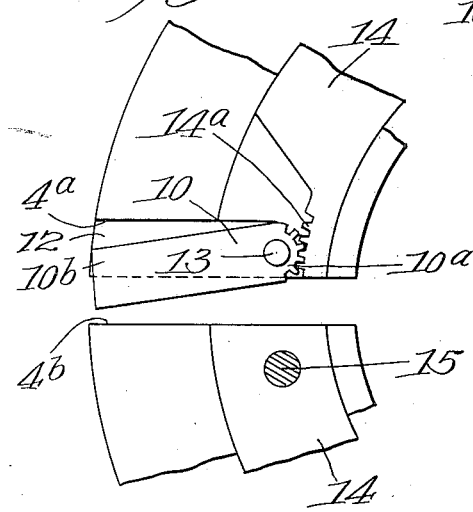
Witnesses:
Inventor:
John K. Stewart.
By Burton & Burton
Attorneys.

UNITED STATES PATENT OFFICE.

JOHN K. STEWART, OF CHICAGO, ILLINOIS.

MAGNETIC SPEEDOMETER.

1,033,840.

Specification of Letters Patent. Patented July 30, 1912.

Application filed May 13, 1911. Serial No. 627,069.

*To all whom it may concern:*

Be it known that I, JOHN K. STEWART, a citizen of the United States, residing at Chicago, in the county of Cook and State of Illinois, have invented new and useful Improvements in Magnetic Speedometers, of which the following is a specification, reference being had to the accompanying drawings, forming a part thereof.

The purpose of this invention is to provide in a magnetic speedometer means for overcoming the effect of temperature changes upon the action of the instrument.

It consists of the features and elements shown and described as indicated in the claims.

In the drawings:—Figure 1, is a sectional elevation of a speedometer showing the interior construction embodying this invention, section being taken as indicated at line 1—1, on Fig. 2. Fig. 2 is a section taken at line 2—2, on Fig. 1, the magnet being shown with the top cover-plate removed to show the features embodying this invention. Fig. 3 is an enlarged detail plan view of an auxiliary pole-piece and its operating connections.

As represented in the drawings this speedometer is of a comparatively simple and usual type, comprising a case, 1, a driving shaft, 2, and a rotatable carrier, 3, adapted to be driven from the shaft, 2, by beveled gears, $2^a$ and $3^a$, of the shaft and carrier respectively. Upon the carrier, 3, there are fixedly mounted a permanent magnet, 4, and a soft iron ring, 5, separated from the magnet by space sufficient to admit a cylindrical portion, $6^a$, of the cup-shaped, non-magnetic disk, 6, journaled co-axially with the carrier. Connected to the spindle, 7, of this disk, there is shown the usual biasing-spring, 8, and indicator, 9. As is well understood, the operation of this type of instrument depends upon a magnetic drag which acts upon the disk, 6, counter to the force of its spring, 8, whenever the magnet, 4, is rotated. It is also well understood that a rise of temperature tends to decrease the electrical conductivity of the disk, 6, and to occasion a corresponding decrease in the effect of the magnetic drag upon the disk, if the strength of the rotating magnetic field produced by the magnet, 4, remains constant. As shown, the magnet, 4, has the form of a "split ring", being almost a complete annulus. The function of the soft iron ring, 5, is to concentrate the magnetic field about the magnet, 4; in the annular space between the magnet and the ring, into which the portion, $6^a$, of the disk protrudes. The strength of this magnetic field in the neighborhood of the magnet depends on the proximity of its poles, being greater or less according as these poles are separated by a greater or less air gap.

The purpose of the present invention is to overcome the effect of a rise in temperature in decreasing the conductivity of the disk, 6, and the consequent effect of the magnetic drag upon it, by increasing the actual strength of the rotating magnetic field simultaneously with such increase of temperature. This is accomplished by providing the end, $4^a$, with a movable pole-piece, 10, designed to be always in contact with the end of the magnet, 4, but movable for varying its own distance from the other pole, $4^b$; as shown, it consists of a small piece of metal pivotally carried between two cover-plates, 11 and 12, formed as "split rings" to fit the upper and lower flat surfaces of the magnet. The end, $4^a$, of the magnet is notched sufficiently to admit the pole-piece, 10, which is carried on a pin, 13, extending through both cover-plates. The cover-plates extend over the notch in the pole, $4^a$, so as to be always in contact with the upper and lower faces of the pole-piece, 10; thus the element, 10, is at all times in effect one of the poles of the magnet, 4, and the fact that it is a separate piece may be regarded merely as a mechanical expedient for rendering one pole extensible toward the other pole, so that the air-gap between the poles may be varied for varying the strength of the magnetic field surrounding the magnet.

Just under the cover-plate, 11, there is formed in the magnet an annular channel in which there is fitted a "split ring", 14, of copper or other metal having a different coefficient of expansion from that of the steel of which the magnet is made. This copper element is fixed to the magnet by a rivet, 15, shown near the end, $4^b$, the other end of the element, 14, (which is free to move with respect to the magnet under the influence of temperature changes) is formed with a short series of gear teeth, 14ª, which mesh with a corresponding segmental gear, 10ª, cut upon the pole-piece, 10, concentrically about its pivot, 13. The radius of the gear segment, 10ª, is so small as compared with the total length of the pole-piece, 10, that slight elongation or contraction of the element, 14, is several times multiplied in the movement of the outer end, 10ᵇ, of the pole-piece.

With the parts arranged as shown, and assuming that for a given rise of temperature the element, 14, will elongate more than the magnet, 4, it will be seen that such a rise of temperature will operate to move the geared end, 14ª, of the copper element toward the opposite pole, 4ᵇ, of the magnet, causing an opposite movement of the pole-piece, 10, that is, a movement away from the pole, 4ᵇ, with a consequent widening of the air gap between the poles. Since a rise of temperature tends to decrease the effectiveness of a magnetic field of given strength, it is desirable that the strength of the field be increased to compensate for its loss of efficiency, and, this is what is accomplished by increasing the air gap between the poles. Thus, when the ratio between the radius of the gear segment, 10ª, and the length of the portion, 10ᵇ, of the pole-piece has been properly related to the co-efficient of expansion of the element, 14, as compared with the co-efficient of expansion of the magnet, the device serves to automatically accommodate the action to variable conditions of temperature, thus considerably increasing the accuracy of the instrument.

I claim:—

1. In a magnetic speedometer, a magnet, one pole of which comprises a pole-piece mounted for movement in contact with the magnet body toward and from the other pole of the magnet, and a thermostatic device adapted for effecting such movement of the pole-piece.

2. In a magnetic speedometer, a rotatably mounted magnet having the form of a "split ring", one pole being extensible toward the other, and a thermostatic device adapted for effecting the extension of said pole.

3. In a magnetic speedometer, a rotatably mounted magnet having the form of a "split ring", one pole being extensible toward the other, and a "split ring" of different metallic composition from the magnet and mounted thereon, having one end secured thereto and having the other end operatively connected with the extensible pole of the magnet.

4. In a magnetic speedometer, a rotatably mounted magnet having the form of a "split ring", one pole comprising a pole-piece pivotally connected to the magnet for moving toward and from the other pole thereof, a "split ring" of different metallic composition from the magnet and mounted thereon, having one end operatively connected with the pivoted pole-piece and having the other end secured to the magnet.

5. In a magnetic speedometer, a magnet having the form of a "split ring", and provided with a pole-piece pivoted at one end thereof, and having gear teeth formed concentrically about its pivot, and a thermostatic device fixed to the magnet, having its free movable portion formed with gear teeth adapted to mesh with the gear of the pole-piece for moving the latter toward and from the other pole of the magnet.

6. In a magnetic speedometer, a magnet having the form of a "split ring" and having an annular groove formed in one of its faces concentrically about the axis of the ring, cover-plates secured to two opposite faces of the magnet, the magnet having an auxiliary pole piece mounted between the cover-plates, and a "split ring" of different metallic composition from the magnet lodged in the aforesaid groove, having one end fixed to the magnet, and the other end operatively connected with the pole-piece for moving it about its pivot.

7. In a magnetic speedometer, comprising a case, a carrier mounted for rotation therein, a magnet having the form of a "split ring", mounted on the carrier, a soft iron ring of greater diameter than the magnet, mounted concentrically therewith on the carrier, with an annular space separating it from the magnet, a non-magnetic element journaled co-axially with the carrier and having the form of an inverted cup protruding into the annular space between the magnet and the ring, and a biasing spring therefor, one end of the magnet having an auxiliary pole-piece pivotally connected thereto, the pivot being parallel with the axis of the magnet carrier, and a thermostatic device on the magnet adapted for rotating the pole-piece about its pivot.

8. In a magnetic speedometer, comprising a case, a carrier mounted for rotation therein, a magnet having the form of a "split ring", mounted on the carrier, a soft iron ring of greater diameter than the magnet, mounted concentrically therewith on the carrier, with an annular space separating it from the magnet, a non-magnetic element journaled co-axially with the carrier and having the form of an inverted cup protruding into the annular space between the magnet and the ring, and a biasing spring therefor, the magnet having an auxiliary pole-piece pivoted between the end of the magnet body at one end of the magnet and in contact therewith, the longer end of the pole-piece extending from its pivot outwardly toward the aforesaid annular space, and a thermostatic device mounted on a magnet in operative connection with the shorter end of the pole-piece.

9. In a magnetic speedometer, comprising a case, a magnet and a non-magnetic disk co-axially journaled therein, means biasing one of them against rotation, and a soft iron ring encircling the magnet and separated therefrom by an annular air space, one pole of the magnet being extensible toward the other, and a thermostatic device adapted for effecting the extension of said pole.

10. In a magnetic speedometer comprising a revolving magnet, an armature mounted near said magnet and separated therefrom by an air gap, a biased non-magnetic element mounted for oscillation in said air gap, one pole of the magnet being extensible toward the other, and a thermostatic device adapted for effecting the extension of said pole.

In testimony whereof I have hereunto set my hand, April 29, 1911.

JOHN K. STEWART.

Witnesses:
 LUCY I. STONE,
 M. GERTRUDE ADY.